United States Patent
Butchko

(10) Patent No.: US 6,216,636 B1
(45) Date of Patent: Apr. 17, 2001

(54) APPARATUS FOR LIFTING AND ASSISTING CONVALESCENT PETS

(76) Inventor: David Butchko, 2909 La Puente Pl., Farmington, NM (US) 87401

( * ) Notice: Subject to any disclaimer, the term of this patent is extended or adjusted under 35 U.S.C. 154(b) by 0 days.

(21) Appl. No.: 09/156,731

(22) Filed: Sep. 17, 1998

(51) Int. Cl.⁷ ............................. A01K 29/00; A62B 35/00
(52) U.S. Cl. ............................................. 119/497; 119/770
(58) Field of Search .................................... 119/496, 497, 119/712, 725, 728, 770

(56) References Cited

U.S. PATENT DOCUMENTS

| | | | |
|---|---|---|---|
| D. 290,178 | * 6/1987 | Nissen | 119/497 |
| D. 330,273 | 10/1992 | Cernek | D30/152 |
| 490,053 | * 1/1893 | Underkofler | 119/725 |
| 1,579,420 | 4/1926 | Welch | 294/152 |
| 3,850,144 | * 11/1974 | Springer et al. | 119/497 |
| 4,530,309 | 7/1985 | Collins | 119/728 |
| 4,559,906 | 12/1985 | Smith | 119/865 |
| 4,570,577 | * 2/1986 | Bellinger | 119/725 |
| 4,644,902 | 2/1987 | Doyle | 119/497 |
| 4,944,057 | 7/1990 | Shaw | 5/89.1 |
| 5,074,795 | * 12/1991 | Clark | 119/770 |
| 5,101,768 | * 4/1992 | Cates | 119/770 |
| 5,193,486 | 3/1993 | Kitchens | 119/725 |
| 5,540,188 | * 7/1996 | Heinrichs | 119/770 |
| 5,738,043 | 4/1998 | Mauel | 119/497 |
| 5,971,668 | * 10/1999 | Miller | 119/770 |

FOREIGN PATENT DOCUMENTS

14541 * 7/1893 (GB) ..................... 119/770

* cited by examiner

Primary Examiner—Peter M. Poon
Assistant Examiner—Elizabeth Shaw
(74) Attorney, Agent, or Firm—Rod D. Baker

(57) ABSTRACT

An device for assisting four-legged pets to walk during periods of convalescence from foot, leg, or hip surgery or injury. A sling portion is connected to two handle grips. The sling portion may be disposed under the chest of the animal in the case of debilitated front legs, or under the abdomen in the case of debilitated hind legs, and the handle grips grasped by a human user to help support or lift the pet. The invention is particularly useful for assisting a convalescent pet to take beneficial walks without having to bear full weight on injured limbs or hips. A version of the device is disclosed which may be adjusted in length to accommodate the size of the animal and the height of the user.

10 Claims, 8 Drawing Sheets

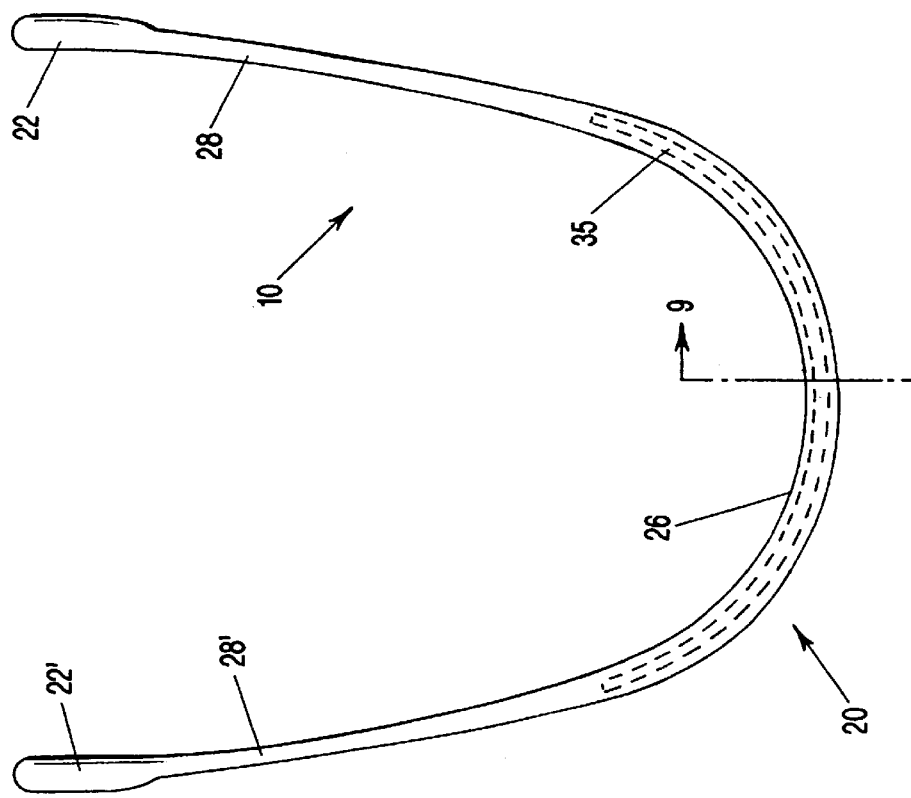
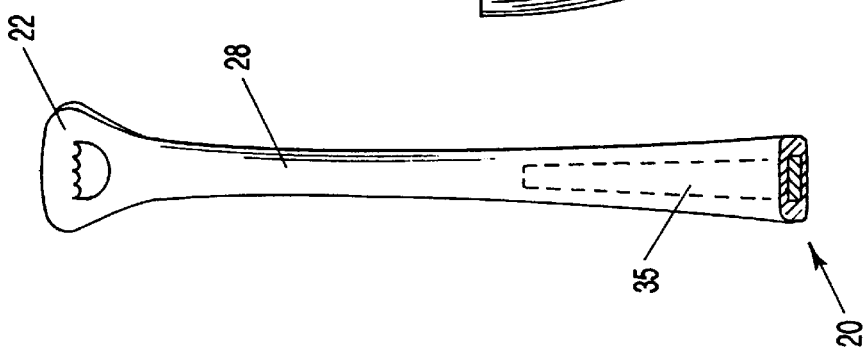
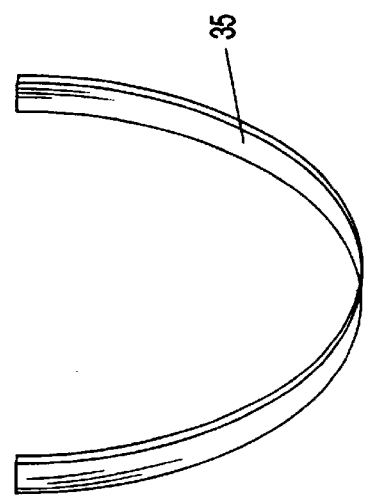

APPARATUS FOR LIFTING AND ASSISTING CONVALESCENT PETS

BACKGROUND OF THE INVENTION

1. Field of the Invention (Technical Field):

The present invention relates to an apparatus for carrying pets, particularly dogs, and more particularly for assisting dogs convalescing or suffering from foot or hip ailments.

2. Background Art:

Pets occasionally suffer from injury, disease, or genetic defects which cause them difficulty in walking. Dogs, particularly, with unfortunate frequency suffer injury to their legs, making walking difficult. Also, dogs sometimes experience hip displasia and other hip disorders, requiring corrective surgery. When dogs are convalescing from injury and/or surgery, they nevertheless must be moved about, and preferably also are permitted a daily walk to promote proper healing and provide other benefits to pet and owner.

It is known generally to provide devices for carrying pets. For example, U.S. Pat. No. 4,530,309 to Collins shows a multi-piece harness device that includes a collar portion placed around a dog's neck and a belly band portion which completely surrounds the animal's thorax. A handle is attached to the belly band to permit the user to assist the animal, for example, while climbing stairs. U.S. Pat. No. 4,559,906 to Smith discloses a small animal harness featuring a pair of vertical straps that wrap virtually completely around the trunk or thorax of the animal, and a third strap connected to the first to that passes horizontally around the front of the animal. Buckles or snaps or the like are used to secure the device around the animal. A handle is attached to the two vertical straps, and the animal may be carried thereby.

U.S. Pat. No. 4,644,902 to Doyle shows a pet carrier including a pouch-like portion having four holes therein through which the animal's legs are inserted. A pair of straps, joined by a buckle, extend from the pouch and when connected together serve as a looped handle. The device is intended for use to lift the animal completely clear of the ground for carrying.

U.S. Pat. No. 5,193,486 to Kitchens teaches a pet carrier device which is convertible into a jacket. A collar portion circumscribes the animal's neck, while a flexible bag-like body portion is disposed completely surrounding the animal's body. A carry handle is connected to the bag-like body portion.

The shortcomings in the referenced art include complexity, cost, and potential over-restraint of the animal. Many of the known pet carriers are intended for use to lift the animal entirely off the ground for carrying, as into a motor vehicle or through a busy airport, etc. All are needlessly complicated, resulting added expense and inconvenience in use. Unnecessarily confining devices are unpleasant to the pet, which quickly learns to resist their use.

The difficulties with known devices are perhaps best indicated by the fact that veterinary professionals seldom use them. Currently, most veterinary professionals employ a common household towel, slung beneath the animal's abdomen, as a simple sling with which to lift or walk an injured dog. This practice, commonly called "toweling" in the veterinary profession, also is a less than optimal way to assist the convalescing animal. Due to the bulkiness of the towel, two hands normally are required to support the animal when toweling. Also, the user's grip on the towel is always less than ideally secure; the towel can slip through the user's grip, potentially injuring or frightening the animal. Consequently, if the animal is to be taken for a therapeutic walk, it is usually necessary to have one person perform the toweling, while a second controls the animal with a leash.

Furthermore, the devices known in the art are needlessly complex, which boosts cost. Some veterinary facilities perform numerous towelings per day. For reasons of hygiene, it is very preferable not to share towels or other carrying devices between different animals. The veterinarian prefers not to invest in numerous expensive carrier devices in order to provide each animal with its own carrier. As a result, many veterinary facilities currently launder numerous towels each day.

A need remains, therefore, for a pet carrier which is simple to make and use, inexpensive, comfortable for the animal, and which provides a secure grip for the user. The ideal pet carrier can be placed under the chest of the animal to permit the user to support weight off the animal's front legs while walking the back legs. Even more commonly, it is desirable to some or all the animal's weight off its back legs, while allowing the animal's front legs to functional normally during an exercise walk. Against the forgoing background, the present invention was developed.

SUMMARY OF THE INVENTION (DISCLOSURE OF THE INVENTION)

The invention relates to an apparatus for assisting a pet to walk during periods of rehabilitation from foot, leg or hip injury or surgery. To assist an animal to walk when one or both front legs, feet, or shoulders are recovering, the apparatus is placed under the chest or thorax of the animal to permit the user to supply additional lift or support to the front end of the animal's body. Similarly, to assist an animal to walk when one or both hind legs, feet, or hips are recovering, the apparatus is placed under the lower abdomen of the animal to permit the user to supply additional lift or support to the rear end of the animal's body. In this manner, the recuperating limbs need not bear the full weight they ordinarily bear. As a result, the animal can safely be taken for a walk, despite the injured body parts. Walks are known to serve worthy therapeutic purposes for convalescing dogs, and the present invention permits such walks to be taken with the safety and comfort of the animal foremost.

Thus, according to the invention there is provided an apparatus for supporting only one end of a four-legged animal while the legs at the other end of the animal walk upon the ground. The apparatus includes a sling portion comprising a padded central section and two distal sections, the padded central section disposable beneath the only one end of the animal in contact with the animal's sides and chest or abdomen remotely from the legs at the other end of the animal, and two handle grips, one of each the grips on a respective one of the distal sections, so that when the sling portion is disposed beneath the one end of the animal, the distal sections extend upward from the sides of the animal out of contact with the back of the animal thereby to dispose the grips above the back of the animal. In one embodiment of the invention, the central section, the distal sections, and the handle grips are integrally molded from a polymer foam, which preferably also includes a generally arcuate reinforcing rib in the central section to maintain the central section in an arcuate shape.

In another embodiment, the central section and the distal sections comprises at least one strap fashioned from a material selected from the group consisting of leather, plastic, woven nylon webbing, and canvas. Preferably, in this case, the strap is made from plastic and the grips are integrally molded with the strap. A strip of padding material is securely attached parallel to a side of the strap. Preferably, but not necessarily, the strip of padding material and the central section define two parallel arcs, and wherein the radius of the arc of the padding material is less than the radius of the arc of the central section, thereby tending to maintain the central section in a substantially arcuate shape.

In an adjustable version of this embodiment, the central section and the distal sections have two straps releasably connectable together, and means for selectively adjusting the total connected length of the two straps whereby to adapt the effective length of the sling portion to accommodate the size of the animal. The means for secretively adjusting comprises a member selected from the group consisting of buckles, hook-and-loop fabric fasteners, buttons, and snaps.

A primary object of the present invention is to provide a pet assist apparatus that is simple and in expensive.

Another object of the present invention is to provide a pet assist apparatus which permits a single person to therapeutically walk a pet convalescing from leg or hip injuries or surgery.

A primary advantage of the present invention is that it is simple.

Another advantage of the invention is that a pet assist apparatus is provided which fosters a reliable, secure, supportive grip for the user.

Another advantage of the invention is that it does not have to be custom-fitted to the animal.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 8 is a front view of the embodiment shown in FIG. 6;

FIG. 9 is a side sectional view of the embodiment shown in FIG. 8, the section taken substantially along line 9—9 in FIG. 8;

FIG. 10 is a perspective view of the reinforcing rib member which is shown in phantom in FIG. 8.

DESCRIPTION OF THE PREFERRED EMBODIMENTS (BEST MODES FOR CARRYING OUT THE INVENTION)

The invention is a simple apparatus for assisting a convalescent pet, such as a dog, to walk despite debilitating surgery or injury to one pair of the animal's two pairs of legs, or to the shoulders or hips, or to a front leg or a back leg. The apparatus of the invention may be disposed beneath either end of the animal, depending upon whether the front leg(s)/shoulder(s) or the rear legs(s)/hip(s) are involved in the injury or treatment. By means of the invention, partial or complete support may be provided to the injured end of the animal, allowing the animal to walk upon the legs and feet at the uninjured end. While the apparatus may be used to lift the injured end of the animal (including the feet) completely clear of the ground, the invention is intended primarily to provide partial support to the injured end of the animal, so that the involved legs also contact the ground and are allowed to "walk" without having to bear the full weight ordinarily borne. The apparatus thus allows the user to promote the animal's rehabilitation and morale by assisting the animal to walk. The apparatus may also find ready use in veterinary and kennel facilities on occasions where animals must be lifted partially or completely clear of the floor.

Figure 1:
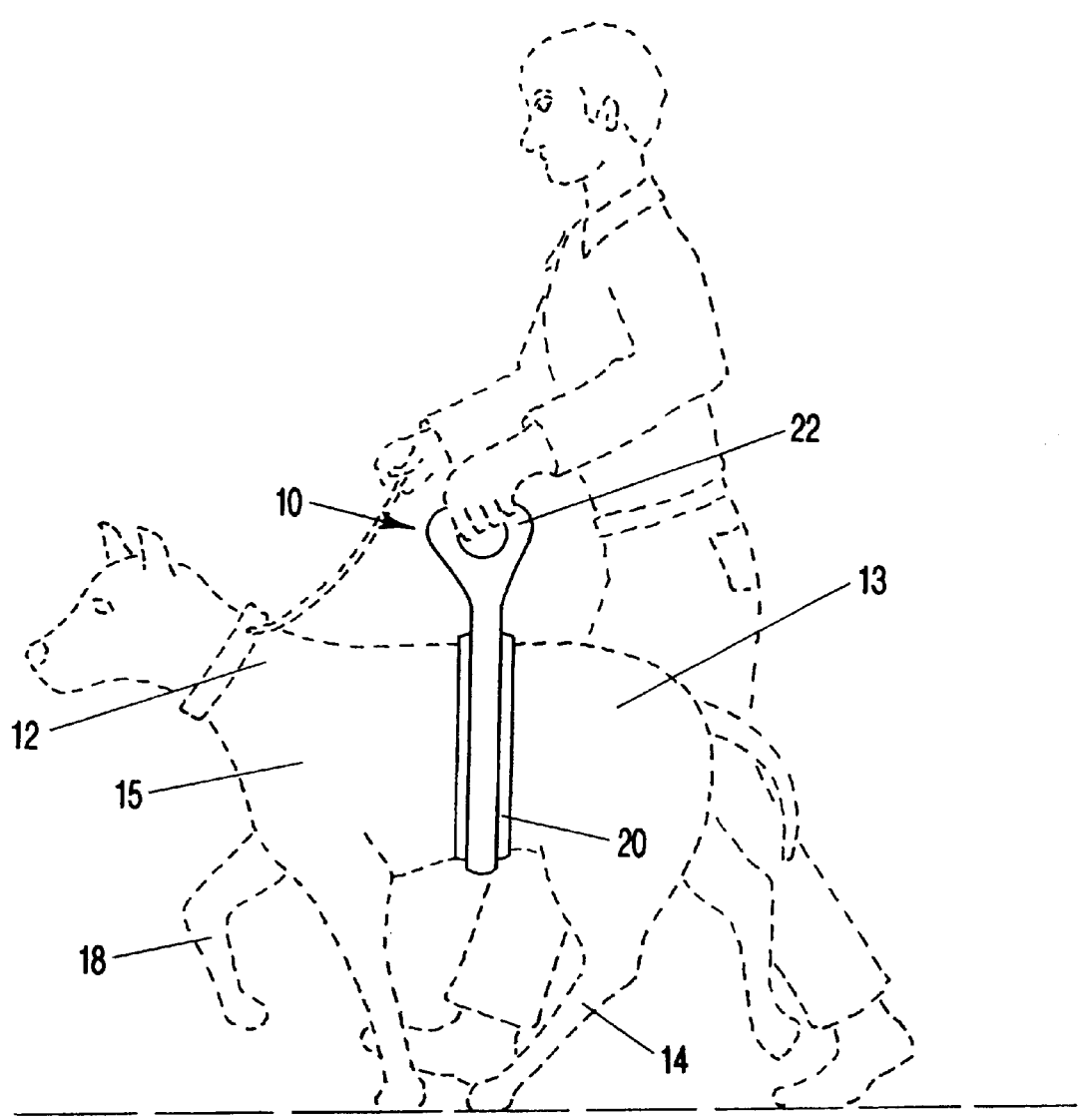
FIG. 1 is a side view of one embodiment of the invention in use on the rear end of a pet dog.
Figure 2:
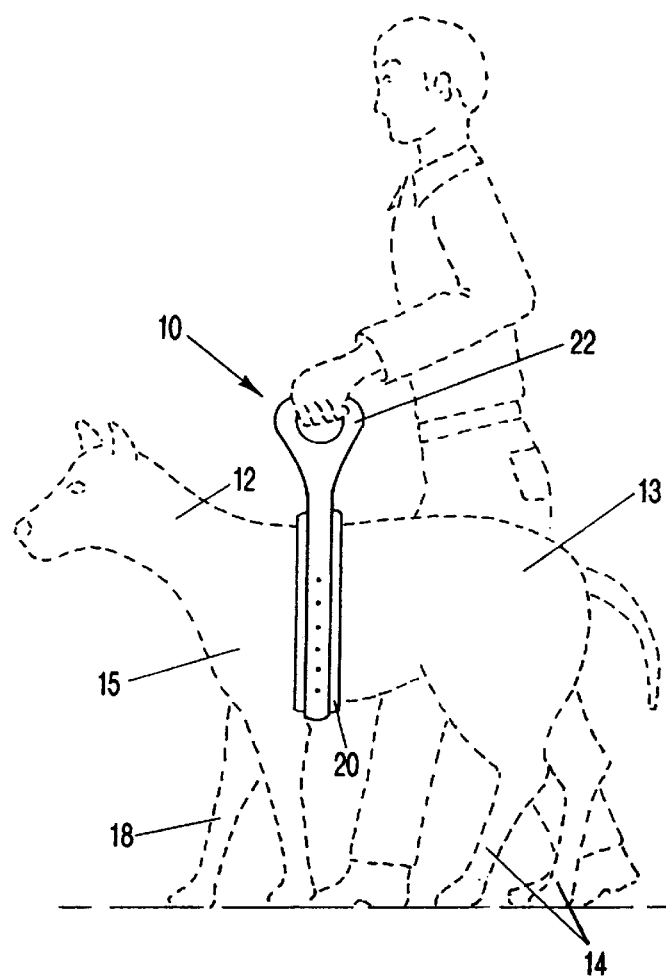
FIG. 2 is a side view of the embodiment of FIG. 1, shown in use on the front end of a pet dog.

Attention is initially invited to FIGS. 1 and 2, showing the pet assist apparatus 10 in use to assist a large dog 12 on its daily walk. In FIG. 1, the apparatus 10 is disposed at the rear end 13 of the animal, in contact with the animal's lower abdomen, to provide support to the rear end of the animal and alleviate some of the animal's weight otherwise borne by the hind legs 14. The invention would be used thus in the case of an animal who has, for example, recently undergone surgery for hip displasia, requiring that the stress on the hind legs 14 be mitigated. FIG. 2 shows how the apparatus 10 alternatively can be disposed at the front end 15 of the animal, in contact with the animal's chest or thorax, to provide support to the front end of the animal 12. Used in this manner, the apparatus 10 reduces the weight borne by the animal's front legs 18, for instance when one of the front legs is in a splint or cast due to a broken bone or the like. In either of the positions for use illustrated in FIGS. 1 and 2, the user grasps the handle grips 22 and pulls gently upward to provided the supplemental support to the respective end of the animal 12, thereby supporting only one end of the four-legged animal 12 while the legs at the other end of the animal walk upon the ground.

Figure 3:
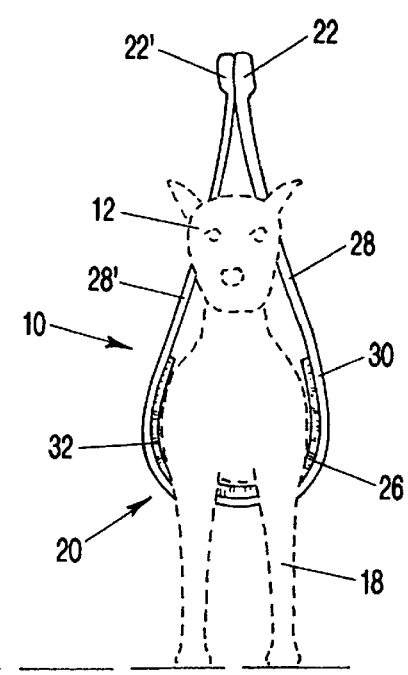
FIG. 3 is a front view of the embodiment of FIG. 2, shown in position upon a pet dog.
Figure 4:
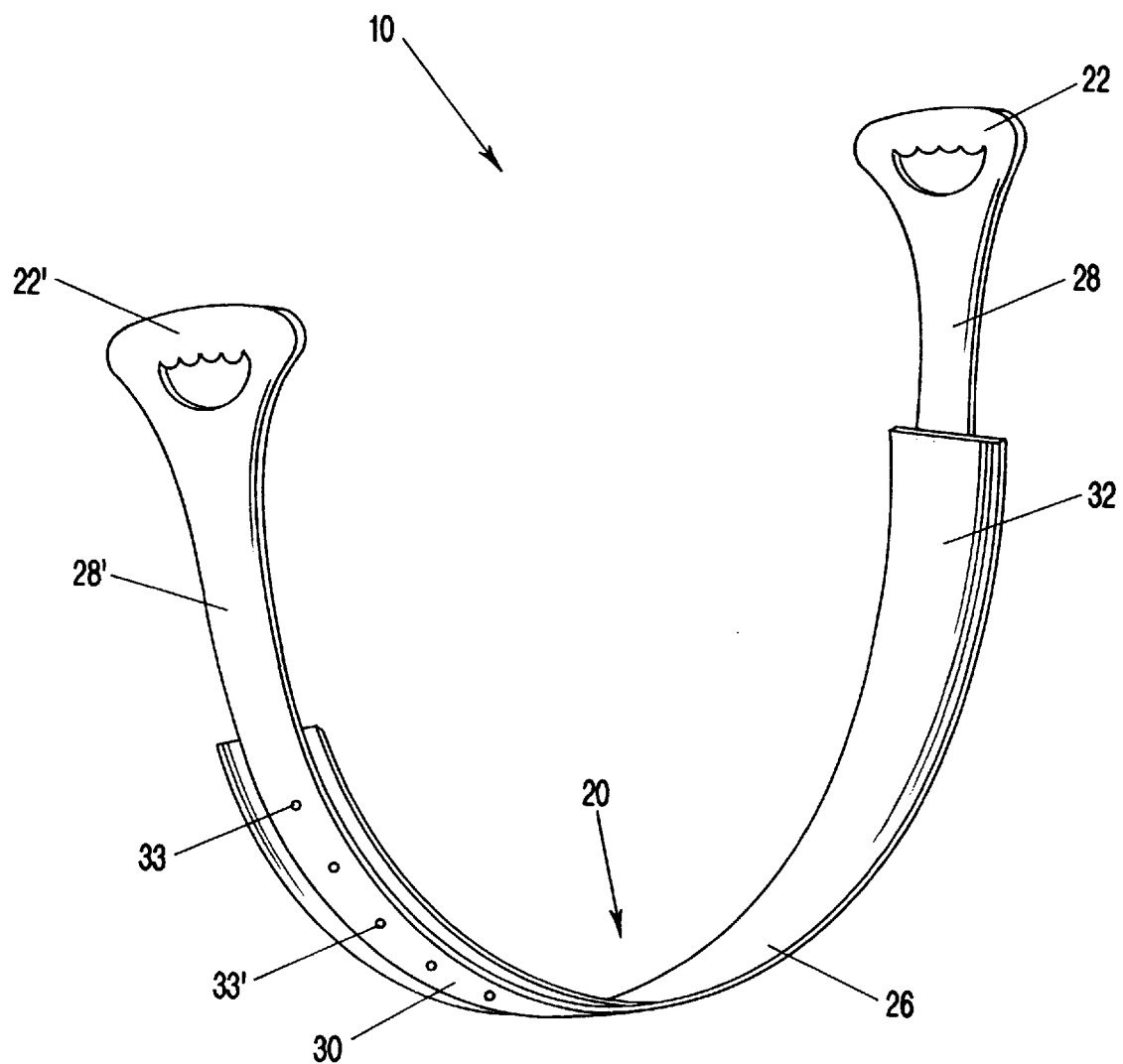
FIG. 4 is a perspective view of a preferred embodiment of the invention.

FIG. 4 illustrates one preferred embodiment of the apparatus 10 of the invention. The apparatus 10 has a sling portion 20 having a padded central section 26 and two distal sections 28, 28'. The central section 26 is disposable beneath one end (either the front end 15 or the rear end 13) of the animal 12, in contact with the animal's sides and chest (FIG. 2), or sides and abdomen (FIG. 1), remotely from the legs at the other end of the animal, as discussed above. Two handle grips 22, 22' are attached to the sling portion 20, one of each of the grips 22, 22' on a respective one of the distal sections 28, 28'. Accordingly, when the sling portion 20 is disposed beneath the one injured or recuperating end of the animal 12, the distal sections 28, 28' extend upward from the sides of the animal 12 out of contact with the back of the animal, as seen in FIG.3. The handle grips 22, 22' thus may be disposed above the animal's back, as seen in FIGS. 1–3. By bringing the grips 22, 22' into contact with each other as seen in FIG. 3, the apparatus 10 is suitable for one-handed use, as seen in FIGS. 1 and 2. A distinct advantage of the invention, however, is that the apparatus 10 does not come into contact with the animal's back. The sling portion 20 securely cradles the animal's body without completely surrounding it. Because the apparatus 10 does not wrap completely around the body of the animal 12, the animal does not feel as confined or "trapped," and therefore does not resent or resist the use of the invention.

Reference is again made to FIG. 4. In one embodiment of the invention, the central section 26 and the distal sections 28, 28' include at least one strap 30 fashioned from any sturdy, durable, flexible material, preferably a material that is easily washed, most preferably plastic. Plastic is desirable in part because it is washable, but also because the strap 30 preferably is bendable but not stretchable. The strap 30 in use should undergo little or no longitudinal stretching or extension, but be laterally flexible. The strap 30 also should be longitudinally incompressible. Alternatively, the strap 30 can be constructed from any other conventional strapping material, including but limited to leather, woven nylon webbing, canvas, and the like. As indicated by FIG. 4, the strap 30 ideally comprises plastic, permitting the handle grips 22, 22' to be integrally molded with the strap 30 into a unitary construction, according to known manufacturing techniques.

The sling portion 20 also includes a strip of padding material 32 securely attached parallel to the strap 30, as by rivets 33, 33' as shown, or by auxiliary straps, adhesives, snaps, VELCRO® fasteners or the like. For the animal's comfort, the padding material 32 may be either permanently attached or removably attached to the strap 30, removable attachments permitting the padding 32 to be removed for laundering. The padding material 32 may be any spongy, elastically resilient, forgiving yet firm material, such as any of the foam rubbers or closed-cell foam polymers commonly utilized for padding purposes. Closed-cell foam urethane padding may be utilized for its ease of washing, but practically any type of known padding, including fabrics, and natural or artificial fiber-filled pads or pillows may be employed without departing from the scope of the invention. The padding strip 32 preferably is secured along its entire length of contact with the strap 30 (as with adhesive) or at closely spaced intervals (such as with a series of rivets or the like). The padding strip 32 may be attached parallel along one side of the strap 30, or alternatively be wrapped around the strap.

Figure 5:
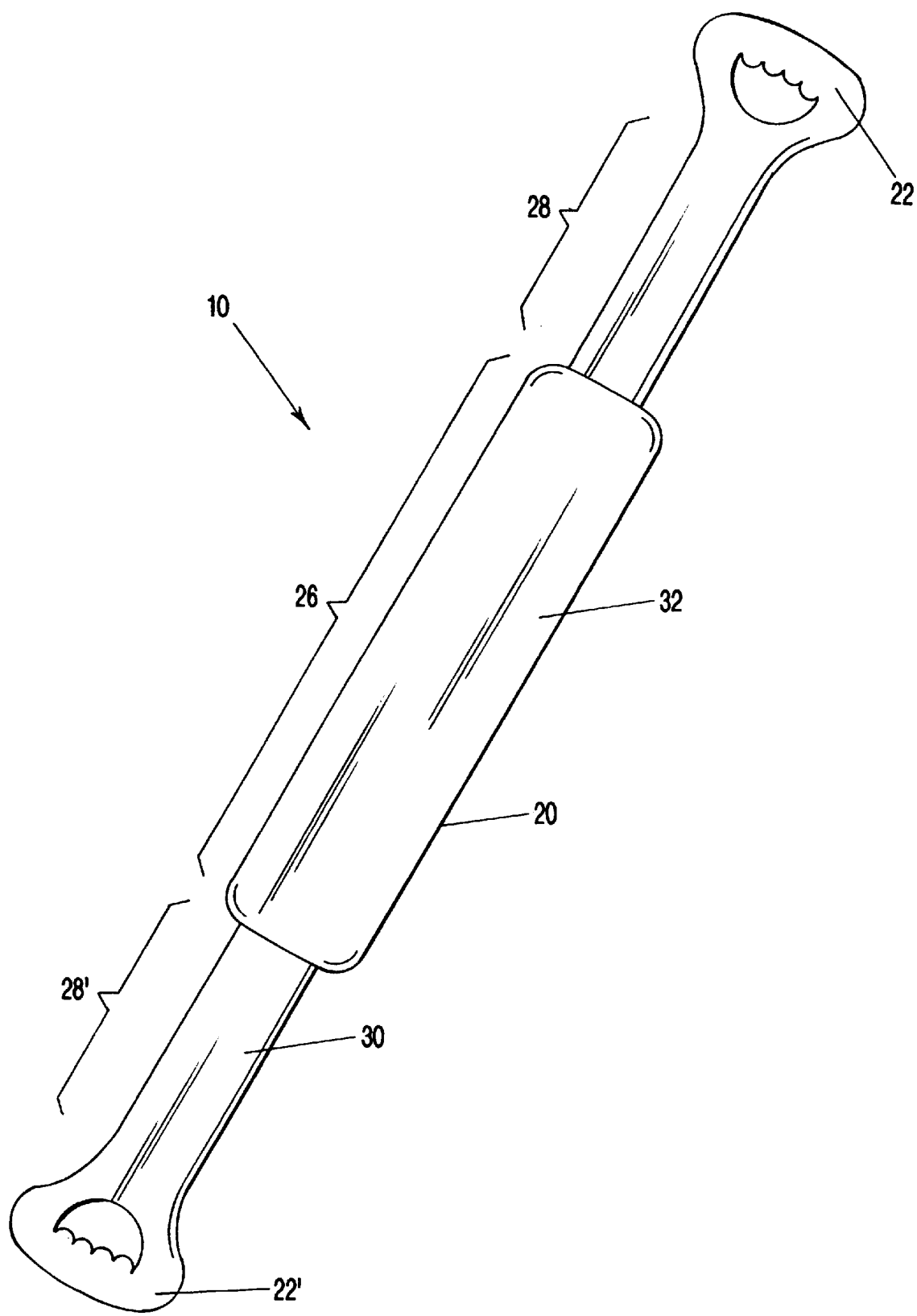
FIG. 5 is a top view of the embodiment of FIG. 5, shown in a flattened position.

FIG. 5 shows the first embodiment of the apparatus 10 in a flattened, generally planar configuration, as it would appear if "unrolled." Preferably, however, the invention includes some means for maintaining the sling portion 20 in a generally arcuate or "U-shaped" configuration, which promotes animal comfort and fosters easy one-handed use of the invention. As seen in FIGS. 3 and 4, the strip of padding material 32 and the central portion of the strap 30 define two parallel arcs. Because the radius of the arc of the padding material 32 is less than the radius of the arc of the curved section of the strap 30, and since the padding strip 32 and the strap 30 are secured together and the strap 30 is longitudinally or axially incompressible, the combination tends to maintain the sling portion 20 in a substantially arcuate shape.

Figure 6:
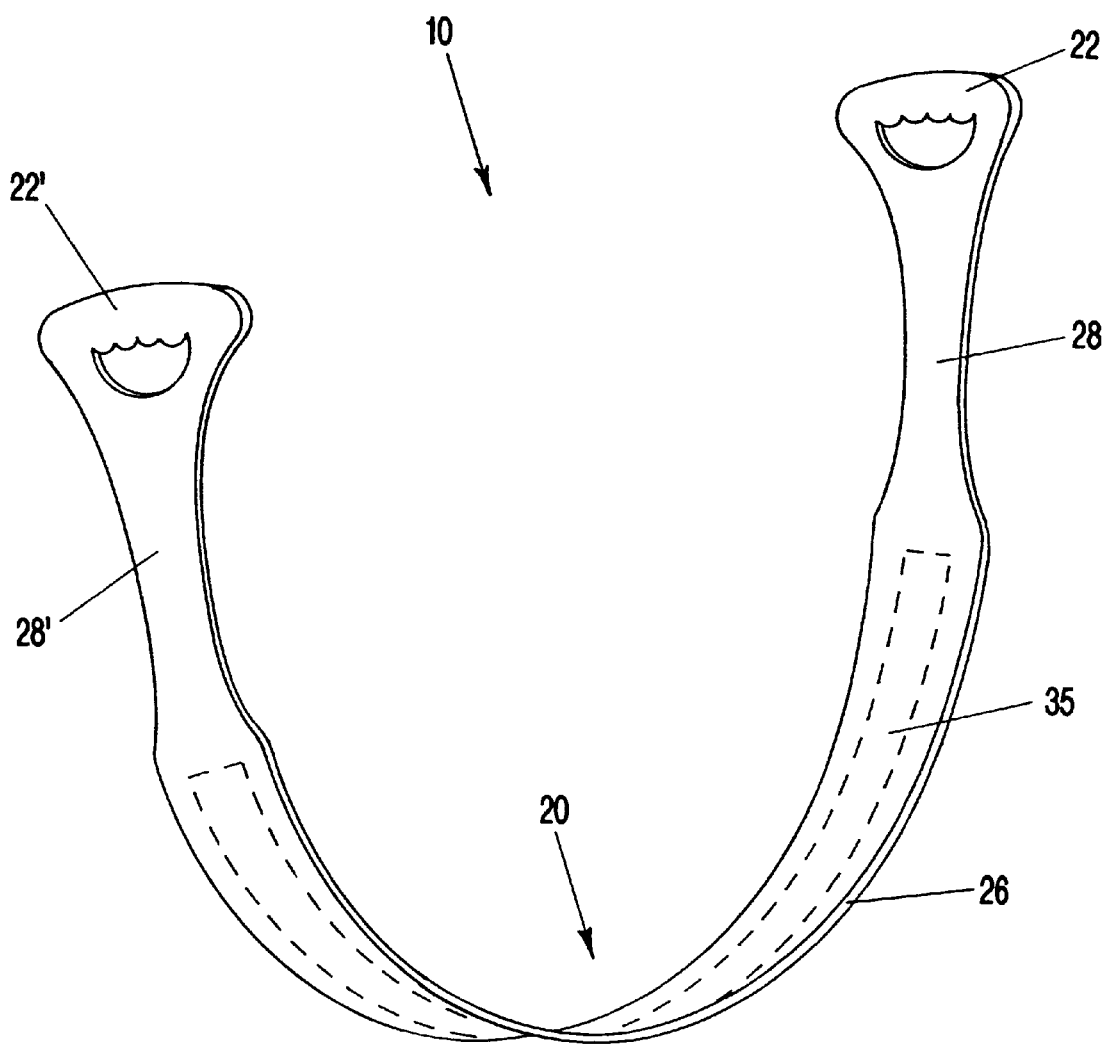
FIG. 6 is a perspective view of an alternative embodiment of the invention.
Figure 7:
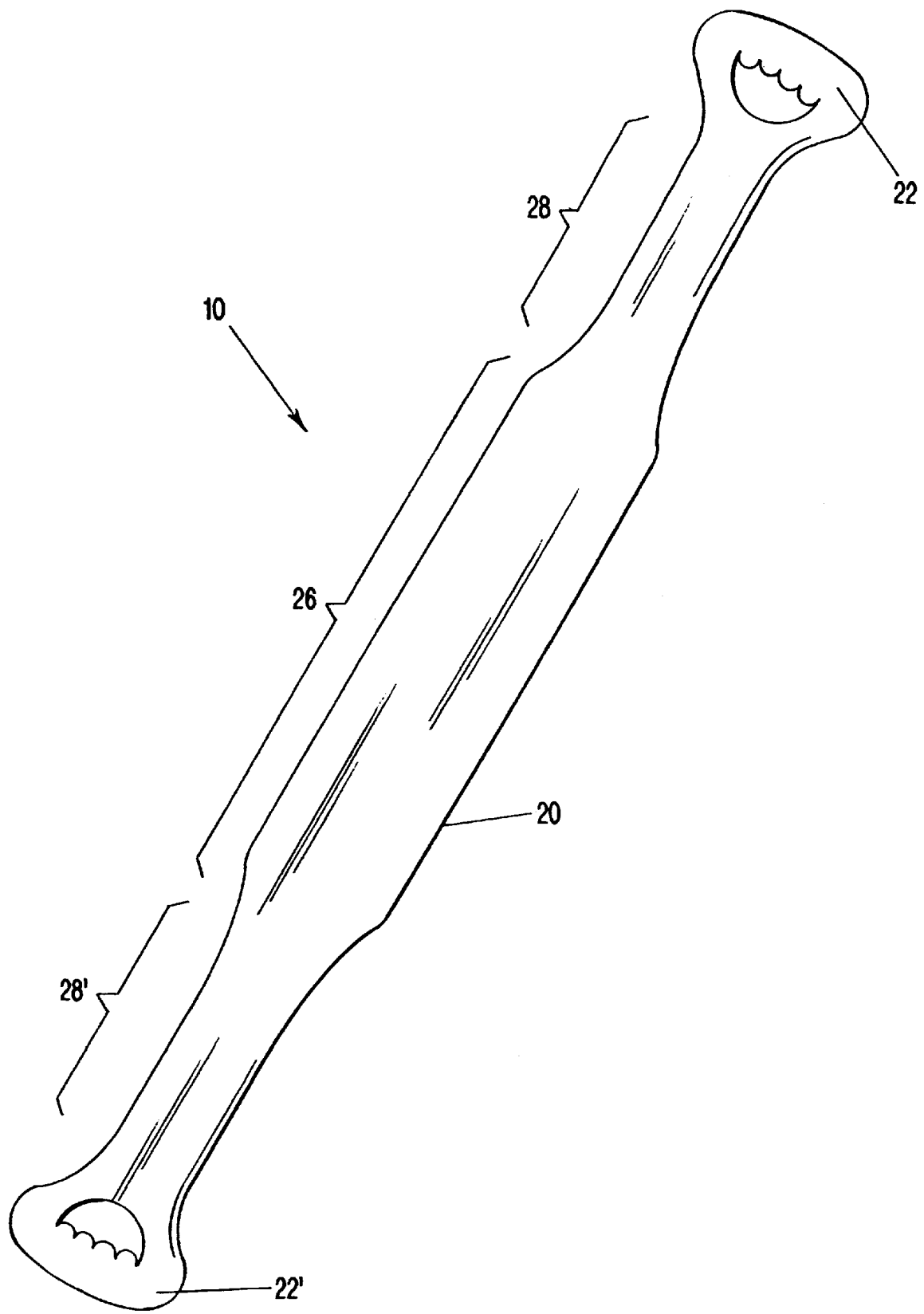
FIG. 7 is a top view of the alternative embodiment of FIG. 6, shown in a flattened position.

FIGS. 6–10 illustrate an alternative embodiment of the apparatus 10. In this embodiment, the central section 26, the distal sections 28, 28', and the handle grips 22, 22' are integrally molded. Preferably, the entire apparatus 10 is fashioned in a single unit and is molded from a polymer foam. Any molded polymer foam, such as suitably prepared polyurethane, will function to provide structural integrity as well as resilient padding. Thus, in this embodiment, the sling portion 20 is an integrated strap and padding strip. As seen in FIGS. 6 and 7, the integrally molded apparatus 10 may be narrower at the distal sections 28, 28' and diverge to a wider central section 26 which comes in contact with and supports the animal. The grips 22, 22' are integrally molded with the distal sections 28, 28'.

This molded version of the apparatus 10 preferably, but not necessarily includes a generally arcuate reinforcing rib 35 in the central section 26 to maintain the sling portion 20 in an arcuate shape. As mentioned, it is desirable to have the sling portion 20 maintained in an arcuate shape to make it easier for the user to place the sling portion 20 beneath the animal with one hand and then grasp and hold both the grips 22, 22' with the other hand. Referring to FIG. 10, the reinforcing rib 35 may be made from any mostly rigid substance with can be slightly flexed, such as a strip of rolled or extruded lightweight metal alloy, or plastic, or the like. The rib 35 should be mildly bendable, but fully elastic to retain its memory of its U-shape. The rib 35 ideally is molded completely within the interior of the central section 26 of the sling portion 20, as seen in the figures, but alternatively could be affixed to the exterior of the outer side of the apparatus 10.

Figure 11:
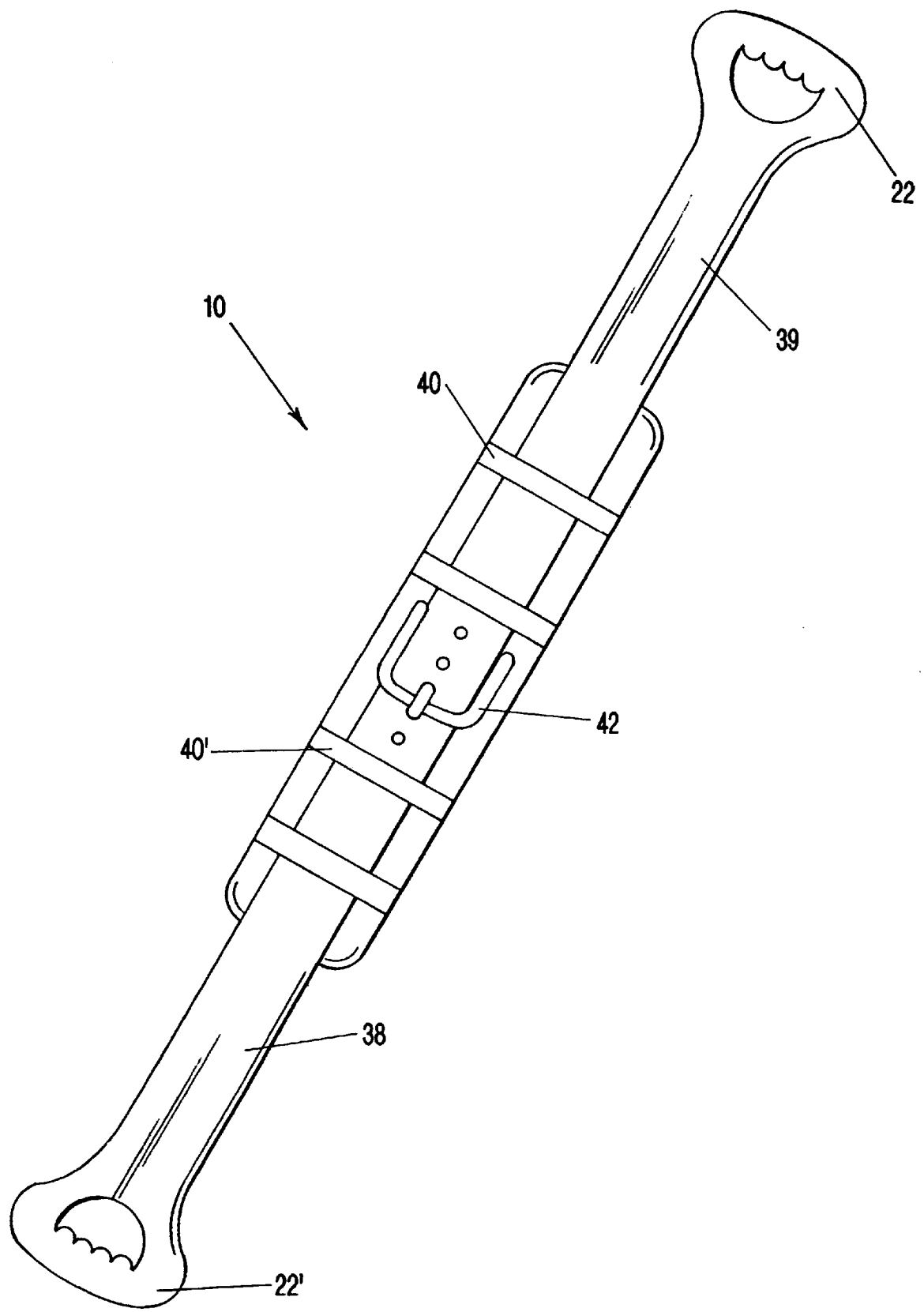
FIG. 11 is a bottom view of an alternative embodiment of the invention, similar to the embodiment shown in FIG. 5, depicting a means for adjusting the effective length of the invention.

FIG. 11 shows an alternative embodiment of the invention, similar in most respects to the embodiment of FIGS. 4 and 5, except that the embodiment of FIG. 11 offers the added advantage of being adjustable in overall length. In the embodiment of FIG. 11, the central section 26 and the distal sections 28, 28', instead of featuring a single strap, have two straps 38 and 39. The co-aligned straps 38, 39 are releasably connectable together, as to function as a single strap, but are provided with some means for selectively adjusting their total connected length. By adjusting the connected length of the two straps 38, 39, the length of the sling portion 20 of the apparatus can be adjusted, thereby to adapt the effective length of the sling portion to accommodate the size of the animal. Thus, by adjusting the combined length of the straps 38, 39, the user of the invention can account for the girth of the animal to be assisted, and the relative heights of the user and the animal, in order to place the grips 22, 22' at a comfortable height above the animal's back (FIGS. 1–3).

As depicted in FIG. 11, the two straps 38, 39 are in slidable contact with one side of the padding strip 32, and are held in place by transverse loops 40, 40' attached to the padding strip. The distal (non-handle) ends of the straps 38, 39 are overlapped in a manner similar to the disposition of a garment belt, so that the means for selectively adjusting the effective length of the two straps 38, 39 can be, for example as illustrated, a conventional buckle 42. As the amount of overlap is selectively increased or decreased, the handle grips 22, 22' are moved closer to or further from the padded strip 32 as the straps 38, 39 slide past the strip 32. The buckle 42 is used to secure the belts 38, 39 at their selected effective length. Alternatively, of course, the overlapping ends of the straps 38, 39 can be releasably connected by any other suitable means known in the art, such as in the arts of garment and packaging belts, for example hook-and-loop fabric fasteners, buttons, snaps and the like.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for supporting one end of a four-legged animal, the apparatus comprising:

a flexible padded sling portion having two ends, said sling portion disposable beneath the one end of the animal remotely from the other end of the animal and in contact with the animal's chest or abdomen, and wherein said sling portion comprises at least one strap; and two handle grips, one of each said grips on a respective end of said sling portion;

wherein when said sling portion is disposed beneath the one end of the animal, said grips are contactable together above the animal's back;

wherein said strap is made from plastic and said grips are integrally molded with said strap.

2. An apparatus according to claim 1 further comprising a strip of padding material securely attached parallel to a side of said strap.

3. An apparatus according to claim 2 wherein said strip of padding material and said strap define two parallel arcs, and wherein the radius of said arc of said padding material is less than the radius of said arc of said strap, thereby tending to maintain said sling portion in a substantially arcuate shape.

4. An apparatus according to claim 1 wherein said sling portion comprises:

two overlapping straps releasably connectable together; and means for selectively adjusting the total connected length of said two straps whereby to adapt the effective length of said sling portion to accommodate the size of the animal.

5. An apparatus according to claim 4 wherein said means for selectively adjusting comprises a member selected from the group consisting of buckles, hook-and-loop fabric fasteners, buttons, and snaps.

6. An apparatus for supporting only one end of a four-legged animal while the legs at the other end of the animal walk upon the ground, the apparatus comprising:

a sling portion comprising a padded central section and two distal sections, said central section and said distal sections comprising at least one strap, and said padded central section disposable beneath the only one end of the animal in contact with the animal's sides and chest or abdomen remotely from the legs at the other end of the animal; and two handle grips, one of each said grips on a respective one of said distal sections;

wherein when said central portion is disposed beneath the one end of the animal, said distal sections extend upward from the sides of the animal out of contact with the back of the animal thereby to dispose said grips above the back of the animal;

wherein said strap is made from plastic and said grips are integrally molded with said strap.

7. An apparatus according to claim 6 further comprising a strip of padding material securely attached parallel to a side of said strap.

8. An apparatus according to claim 7 wherein said strip of padding material and said strap define two parallel arcs, and wherein the radius of said arc of said padding material is less than the radius of said arc of said strap, thereby tending to maintain said sling portion in a substantially arcuate shape.

9. An apparatus according to claim 6 wherein said central section and said distal sections comprise:

two overlapping straps releasably connectable together; and means for selectively adjusting the total connected length of said two straps whereby to adapt the effective length of said sling portion to accommodate the size of the animal.

10. An apparatus according to claim 9 wherein said means for selectively adjusting comprises a member selected from the group consisting of buckles, hook-and-loop fabric fasteners, buttons, and snaps.

* * * * *